W. T. WILDER.
VEHICLE WHEEL.
APPLICATION FILED AUG. 6, 1920.
1,418,221. Patented May 30, 1922.
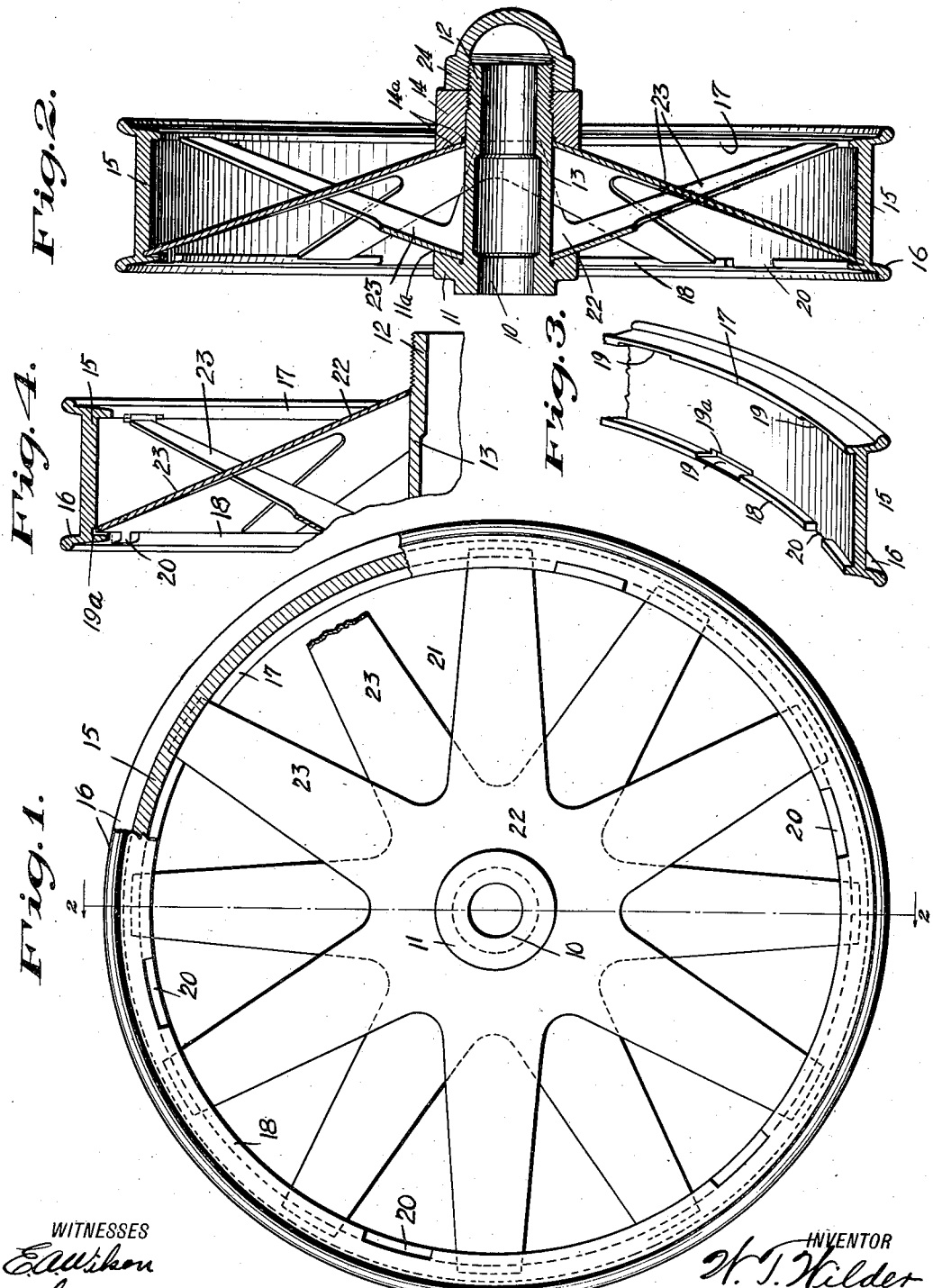

UNITED STATES PATENT OFFICE.

WILLIAM T. WILDER, OF ST. PAUL, MINNESOTA.

VEHICLE WHEEL.

1,418,221.  Specification of Letters Patent.  Patented May 30, 1922.

Application filed August 6, 1920. Serial No. 401,741.

*To all whom it may concern:*

Be it known that I, WILLIAM T. WILDER, a citizen of the United States, and a resident of St. Paul, in the county of Ramsey and State of Minnesota, have invented a new and Improved Vehicle Wheel, of which the following is a full, clear, and exact description.

This invention relates to the construction of wheels, pulleys, or the like, and has particular reference to vehicle wheels adapted especially for carrying pneumatic or cushion tires.

Among the objects of the invention is to so construct a wheel as to include a hub, spoke members carried more or less permanently by the hub, and a rim demountably connected to the outer ends of the spoke members for easy and quick interchange of the tire which will be presumed to be carried permanently by the rim.

More specifically stated the purpose of the invention is to construct a tire supporting rim with inwardly projecting parts adapted for interlocking co-operation with the spoke or web portion of the wheel which latter is carried by the hub.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a view in elevation, partly in section of a wheel showing my invention, the view being of that side of the wheel which ordinarily is located adjacent to the vehicle body.

Fig. 2 is a vertical section on the line 2—2 of Fig. 1.

Fig. 3 is a detail perspective view of a fragment of the rim.

Figure 4 is a detail sectional view corresponding to the upper portion of Fig. 2, but indicating an intermediate stage in the assembly of the parts.

Referring now more particularly to the drawings I show a wheel comprising a hub 10 of any suitable structure or design, but including a rigid flange 11 on its inner end and a threaded neck portion 12 at its outer end, the hub between the flange 11 and the threaded portion consisting of a smooth cylinder 13. A collar 14 is threaded upon the portion 12 at the outer end of the hub and extends inward over a considerable portion of the smooth cylinder 13. The opposing inner faces of the flange 11 and collar 14 are inclined with respect to the planes perpendicular to the axis of the hub as indicated at 11$^a$ and 14$^a$. These parts will be referred to hereinafter as inclined faces.

The rim is indicated at 15 and is of rigid material and of sufficient strength for the purposes of the wheel. As indicated the rim includes outwardly projecting flanges 16 for supporting a tire of any suitable design and not shown because it is of conventional construction. The rim includes also inwardly projecting flanges 17 and 18 of peculiar construction. The flange 17 is continuous and has on its inner surface notches 19 spaced from one another around the rim uniformly and at equal distances. The flange 18 is provided with notches 19 similar to those on the opposite side of the wheel, but staggered with respect thereto around the wheel. The flange 18 is distinguished from the flange 17 in not being continuous but provided with gaps 20, there being as many gaps 20 as there are notches 19 in the flange 18, but the gaps may be located at any desired points between the notches 19.

Between the hub and the rim are arranged any suitable spoke members or spiders 21, shown as two in number, and each of a conical form. The apex portion of the cone constitutes a hub web 22 and having a hole whereby the same is adapted to slip freely over the smooth portion 13 of the hub. One of these hub webs conforms to and fits against the inclined face 11$^a$, while the other is adapted to similarly fit against the inclined face 14$^a$ of the collar 14. These spoke members or spiders are preferably stamped or otherwise formed from sheet material such as sheet steel, or its equivalent, and are notched out to form spokes 23 which may be of any suitable size or form in cross section, but preferably tapered outward toward their free ends.

The width of the free ends of the spokes considered circumferentially of the wheel is substantially equal to the length of the gaps 20 and notches 19. In the assemblage of the wheel the spiders are slipped upon the hub with the spokes of one spider alternating with the spokes of the other. The normal form of the spiders as indicated in the drawings in Fig. 4 is such that the altitude of the cone is materially greater than it is after the wheel is completely assembled, and consequently the length of each spoke considered radially of the wheel is materially less than it is in the finished wheel. It is noted also that the spokes of the several spiders cross one another making a very compact and yet very stiff structure. Next the rim 15 carrying with it any suitable tire or cushion is slipped directly over the ends of the spokes, the gaps 20 receiving first the ends of the spokes pertaining to the web lying against the flange 11. After the rim passes over the ends of these spokes a slight relative rotation is imparted to the rim with respect to the other portions of the wheel so as to bring the ends of the other spokes into position to be passed through the gaps. The collar 14 is then put upon the threaded end of the hub. The collar is preferably provided with threads for threaded co-operation with the hub so that by the application of force as through a wrench to the collar the web portions of the two spiders are caused to approach each other forcibly to the position shown in Fig. 2 whereby the effective length of the spokes will be increased and the ends of the spokes will be forced into all of the notches 19. These notches as indicated at 19ª may extend outward into the body of the rim so as to make a more effective interlock. After the collar 14 is turned or driven to its desired position making a rigid interlocking connection between the spiders and the rim a lock nut 24, indicated as a cap, will be turned upon the threaded end of the hub and so will lock the collar 14 from movement with respect to the hub. By making the collar long enough to overlap a considerable portion of the cylinder 13 the web portion of the outer spider will not drag over the threads during the application thereof to or the removal thereof from the hub, or in the application or removal of a rim.

It will thus be apparent that my improved wheel is of a relatively simple, strong and yet easily manufactured structure and one which is capable of rim interchange with the minimum amount of time and labor. Moreover the wheel is of neat appearance and is practically indestructible. The spokes by reason of the conicity of the spiders have sufficient convexity in cross section to add materially to their rigidity.

I claim:

1. A wheel, comprising a hub, a flanged rim provided with gaps, two conical sheet metal spoke members slidably mounted on the hub and having interlocking engagement with the flanges of the rim, and means on the hub for forcing the spoke members toward each other, whereby the spokes will be forced into firm interlocking engagement with the flanges of the rim.

2. A wheel comprising a hub, two conical sheet metal spoke members slidably mounted on the hub, the spokes of one member extending between the spokes of the other member, a flanged rim provided with seats in its flanges to receive the ends of the spokes, one of the flanges having gaps therein and means on the hub for moving the members toward each to force the spokes firmly into the seats of the rim.

3. The herein described wheel comprising a hub, a rim surrounding the hub and having inwardly projecting parallel flanges, said flanges being provided on their inner faces with notches, and one of them having gaps therein, spoke means extending between the hub and the rim, the ends of the spokes being adapted to enter said notches, and means co-operating with the hub to force the ends of the spokes outward into interlocking engagement in said notches.

4. A wheel comprising a hub having one end screw threaded and provided at its other end with a flange, two spoke members loosely mounted on the hub and having the spokes of one member extending between the spokes of the other member, a rim having inwardly extending flanges provided with notches on their inner faces to receive the ends of the spokes, one of the flanges having gaps therein, a threaded collar on the hub and engaging one of the said spoke members, and a nut on the hub and engaging the collar.

5. A wheel comprising a hub having one end screw threaded and provided at its other end with a flange having a beveled inner face, two conical spoke members loosely mounted on the hub, the spokes of one member extending between the spokes of the other member, one of the spoke members engaging the flange of the hub, a rim having inwardly extending flanges provided with notches on their inner faces to receive the ends of the spokes, one of the flanges being provided with gaps, a threaded collar mounted on the hub and having a beveled inner face engaging the other spoke member, and a nut on the hub and engaging the collar.

WILLIAM T. WILDER.